3,616,573
SEED CAPSULE
Peter J. Clifford, Fresno, Calif., assignor to
FMC Corporation, San Jose, Calif.
Filed Jan. 22, 1969, Ser. No. 793,121
Int. Cl. A01c 1/06
U.S. Cl. 47—57.6
1 Claim

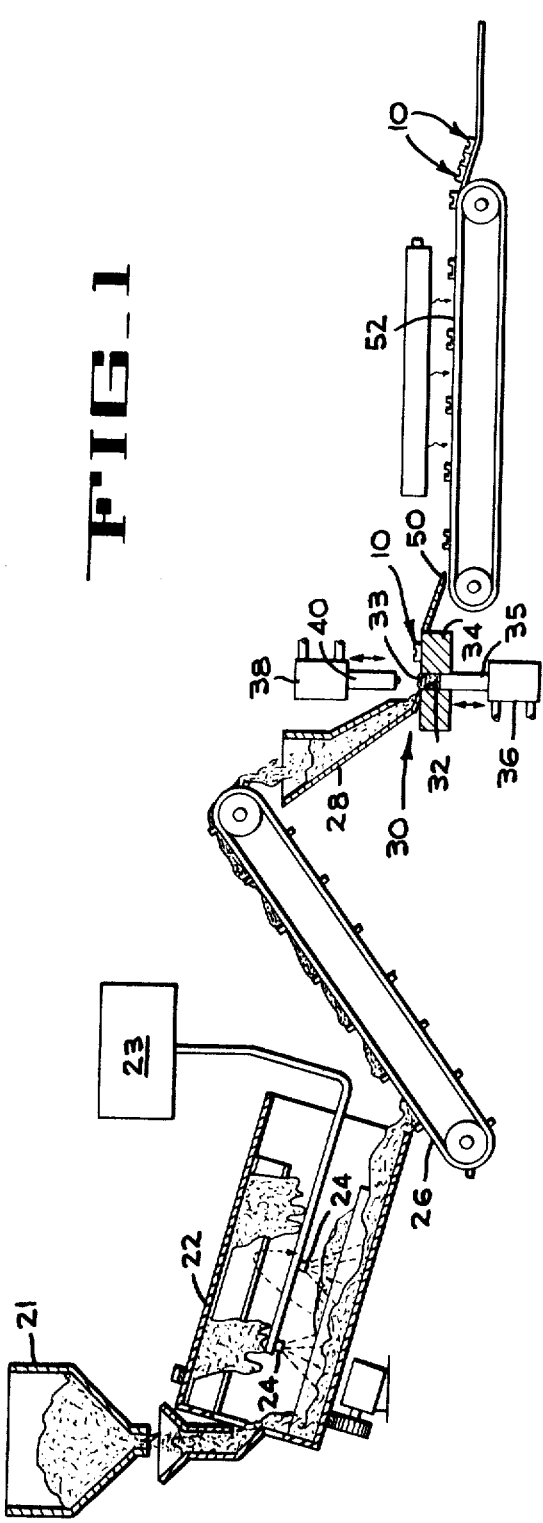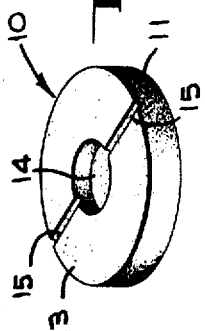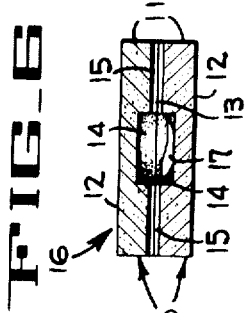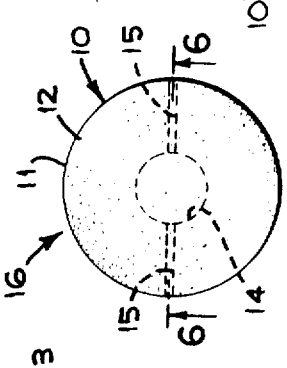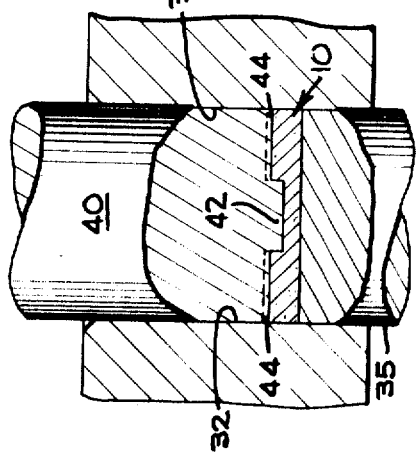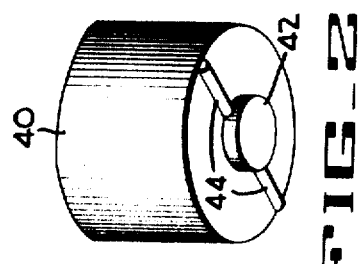
Nov. 2, 1971 — P. J. CLIFFORD — 3,616,573
SEED CAPSULE
Filed Jan. 22, 1969
INVENTOR.
PETER J. CLIFFORD
BY F. W. Anderson
C. C. Tripp
ATTORNEYS United States Patent Office 3,616,573
Patented Nov. 2, 1971

ABSTRACT OF THE DISCLOSURE

Ventilated seed capsules are formed by preparing a charge of seed bed materials, such as vermiculite and binder, compressing the charge to form a base capsule segment having a cylindrical recess therein with radial grooves extending from the cylindrical recess to the outer perimeter of the base segment, drying the base segment, placing a seed in the recess, and enclosing the recess to form a seed containing cavity by securing to the base a cover that has been prepared in the same manner as the base.

BACKGROUND OF THE INVENTION

This invention relates to the germination of seeds, and more particularly concerns an improved ventilated capsule in which a seed is carried. Prior to the discovery of the seed capsule, agriculturalists were concerned with the problem of how to handle the minute seed particles and how to place them in the ground at desired spaced intervals which were preselected for favorable growing condition. A common occurrence is the placement of too many seeds in the preselected interval resulting in an oversaturated field. The remedy then is to thin out the field by going through with cutters which completely annihilated some of the plants and partially damaged a portion of the remaining plants principally by disturbing the root system. The advent of the seed capsule made the seeds easier to handle because of the comparatively larger size of the capsule. The capsules, which each contained a single seed, could very efficiently and accurately be placed in the ground at the desired intervals thus alleviating the need to thin out the field with all its inherent disadvantages.

DESCRIPTION OF THE PRIOR ART

There have been several capsules or coverings proposed to enclose seeds in an effort to facilitate the germination, handling, and planting of the seeds. Some of these capsules or coverings are disclosed in the patents to Hodges 1,645,001, Vogelsang 2,502,809, Clawson 2,785,969, Scott 2,967,376, Tukacs 3,077,700, Eversole 3,113,399, and Legal et al. 3,316,676. It has even been proposed to prepare a mix of vermiculite and a binder such as polyvinyl acetate, embed a seed in the mix, and compress the mix to form a seed pellet.

SUMMARY OF THE PRESENT INVENTION

The present invention concerns itself with a ventilated seed capsule which is strong enough to withstand the action of machinery used to handle, store, and plant the capsule and which has vent channels communicating at one end with a recess in the center of the capsule where a seed is retained and at the other end with the exterior boundaries of the capsule.

In general, the method of preparing the capsule of the present invention calls for separately preparing each element of a two-piece capsule by confining a mix of vermiculite and a binder, compressing the mix, forming a recess in the center of each element, providing radial grooves extending from the recess to the perimeter of each element, placing a seed in the recess of one element, and securing another capsule element of the capsule and securing another capsule element to the seed-containing element to enclose the seed in the cavity defined in the capsule. Preferably, the capsule body is heated after forming, but before the seed is added, to reduce the moisture to equilibrium levels. Since all the pressurizing and heating operations are concluded before the seed is put into contact with the capsule, the seed is not adversely affected by the moisture in the initial mix or by the pressure and heat applied to the mix. This forms the general subject matter of the patent to W. J. Adams, Jr. 3,561,159 issued Feb. 9, 1971 to the FMC Corporation. The radial grooves or channels of the present invention communicating with the seed containing recess provide the seed with access to air and water which accelerates the growth of the seed. The radial channels are small enough to prevent the escape of the seed from the recess in the capsule but large enough to permit ready entry of air and water. The channels have an angular spacing great enough so that when the capsules are planted vertically with one channel straight down another channel will project generally upwardly to serve as an air vent. The capsule can be made of peat moss, a combination of soil and humus materials, or any other suitable material, but preferably is made of a mixture of exfoliated vermiculite with a polyvinyl acetate binder.

Accordingly, it is an object of the present invention to provide a ventilated seed capsule that contains a seed which was not subjected to the forces of compression and heat used in making the capsule.

Another object of the invention is to provide a seed capsule which has means connecting the internal cavity of the capsule to its external environment for the passage of air and water therethrough.

Another object of the invention is to provide a seed capsule which encourages rather than inhibits germination of the seed.

Other and further objects and advantages of the present invention will be apparent from the following specification taken in connection with the accompanying drawings of a preferred embodiment.

DESCRIPTION OF THE DRAWINGS

FIG. 1 is a diagrammatic showing of an apparatus in which the improved ventilated seed capsule of the present invention may be made.

FIG. 2 is a perspective view of the bottom of a plunger or die used in compressing the mix out of which the capsules are made.

FIG. 3 is a side elevational view with part broken away of a plunger or die in a depressed position.

FIG. 4 is a perspective view of an element of a two-part capsule showing a recess with radial grooves communicating therewith.

FIG. 5 is a plan view of a completed capsule.

FIG. 6 is a sectional view of a completed capsule taken along line 6—6 of FIG. 5 and showing a seed resting in the cavity within the capsule.

DESCRIPTION OF THE PREFERRED
EMBODIMENT

The capsule of the present invention illustrated in FIGS. 4–6 comprises two identically shaped members 10 secured together by a suitable adhesive. Each of these members 10 is generally cylindrical in configuration having a cylindrical outer wall 11, a flat circular end wall 12, and a flat circular end wall 13 which has a recess 14 in the center thereof with radial grooves or channels 15 connecting the said recess to the outer wall 11.

When the elements 10 are secured together to form the completed capsule 16 shown in FIGS. 5 and 6, the respective radial grooves or channels 15 of the elements 10 can be aligned in mating relationship to provide fullsized communicating channels between the recess 14 and the exterior cylindrical wall 11. Similarly, the grooves can be nonaligned to provide half-sized channels. For example, one element 10 could have its grooves 15 offset from the grooves 15 of the companion element 10 thereby providing four communicating channels each having half the cross-sectional area of a channel formed when the respective grooves are aligned, or one of the elements could be formed with no grooves as long as its companion element had grooves. Also, it is not necessary that an element 10 be restricted to two radial grooves 15 as the number of grooves as well as their size can be varied to accommodate the desired exposure of the recess 14 to the capsules external environment. As in the case with two diametrically opposed channels 15, the channel spacing should be great enough so that if the capsule is planted vertically with one channel straight down another channel will project generally upwardly to serve as an air vent. The grooves, however should be of a small enough size so that a seed 17 resting in the recess 14 cannot work its way out.

The recess 14 in the illustrated embodiment is shown to be of cylindrical configuration, however, it is not intended that the recess of the present invention be limited to such a configuration as many geometric configurations could be utilized to obtain the same result. The same is true for the grooves 15. They are shown as being straight line grooves of circular cross-section but they could be modified so as not to be straight line or not to be of circular cross-section and still serve the same function of providing for the recess 14 exposure to the external environment of the capsule 16.

An apparatus for making the capsule member 10 is diagrammatically shown in FIG. 1 and comprises a hopper 21 which contains a supply of grade 4 exfoliated vermiculite. A grade 4 material has a particle size such that all of it will pass through a 10 mesh screen and 90% of it will be caught on a 100 mesh screen. The vermiculite is guided into a power driven mixer 22 which has blades and mixing elements that tumble the vermiculite while a binder of polyvinyl acetate in latex form is pumped from a tank 23 and sprayed into the vermiculite suitable nozzles 24. The action is such that a homogeneous mixture of vermiculite and binder is discharged onto a conveyor belt 26 which delivers the mix to the hopper 28 of a tableting press 30.

From the lower end of the hopper 28, a charge of the mix is moved into a cavity 32 of the press 30, the bottom cavity being formed by the cylindrical wall of a passage 33 in a support block 34 and the top surface of a cylindrical plunger 35 that projects from a double acting hydraulic power cylinder 36. An upper cylindrical plunger or die 40, which projects from a double-acting hydraulic cylinder 38, overlies the cavity 32 and has a reduced diameter projection 42 (FIG. 2), as well as radial ridges 44 extending from the projection 42 to the outer wall of die 40, on its lower surface. The actuation of the power cylinders 36 and 38 is so controlled that, starting from the position shown in FIG. 1, the upper plunger or die 40 is forced downwardly to enter the cavity 32 and compress the mix therein against the resistance of the then stationary lower plunger 35 to form the capsule member into the configuration shown by member 10 of FIG. 4. The upper plunger or die 40 is then raised, followed by the lower plunger 35 which raises the capsule member to a position above the upper edges of the cavity 32. The capsule member is then removed manually, or by a suitable stripper member, and directed down a chute 50 onto a processing conveyor 52. The capsule members are then dried by subjecting them to a temperature of approximately 140° F. for about two hours or to room temperature for about sixteen hours.

After the capsule members are dried, a worker drops a single seed 17 into the recess 14 of one capsule member, places an adhesive, such as polyvinyl acetate, on the surface 13 around the recess 14, being careful not to let any of the adhesive get into grooves or channels 15, and then inverts a second capsule member and lightly presses it onto the first member to complete the capsule.

FIGS. 2 and 3 are illustrative of the lower end of the upper plunger or die 40. FIG. 2 shows clearly the relationship between the projecting cylinder 42 and the radial ridges 44 which when pressed into the mix entrapped in cavity 32, form the recess 14 and grooves or channels 15 respectively of capsule member 10. The die 40 may be of the interchangeable type so that dies with varying numbers and sizes of ridges 44 can be utilized as well as a die with no ridges which could be used to make a capsule member 10 with no grooves to be used in cooperation with a member 10 having grooves.

There has been described a durable ventilated seed capsule and a method of producing the capsule. The capsule in its completed form can be handled before and during planting without damaging the seed contained therein. Also the capsule is ventilated to the degree desired for proper germination.

Although the best mode contemplated for carrying out the present invention has been herein shown and described, it will be apparent that modifications and variations may be made without departing from what is regarded to be the subject matter of the invention.

Having completed a detailed description of the invention so that those skilled in the art could practice the same, I claim:

1. A ventilated agricultural capsule assembly comprising a flat base element and a flat cover element formed of insert material, said elements having opposed flat faces with opposed, cooperating recesses at said faces to form a single central seed recess, a seed in said recess, means bonding said flat faces together to form a flat disc capsule assembly, and a plurality of ventilating channels formed in said flat faces and extending radially from said recess to the peripheral edge of the capsule assembly, said channels having a diameter much smaller than the smallest dimension of the seed recess, said channels having an angular spacing great enough so that when the capsules are planted vertically with one channel straight down another channel will project generally upwardly to serve as an air vent.

References Cited

UNITED STATES PATENTS

| | | | |
|---|---|---|---|
| 3,098,321 | 7/1963 | Estkowski et al. | 47—56 |
| 1,446,113 | 2/1923 | Blackwell | 47—34 |
| 3,112,577 | 12/1963 | Burger | 47—37 |
| 3,273,284 | 9/1966 | Anagnostou | 47—34 |
| 3,284,209 | 11/1966 | Kelley | 47—57.6 X |

FOREIGN PATENTS 92,046   12/1921   Switzerland.

ROBERT E. BAGWILL, Primary Examiner

PO-1050
(5/69)

UNITED STATES PATENT OFFICE
CERTIFICATE OF CORRECTION

Patent No. 3,616,573   Dated   November 2, 1971

Inventor(s)   PETER J. CLIFFORD

It is certified that error appears in the above-identified patent and that said Letters Patent are hereby corrected as shown below:

Col. 3, line 19, insert a comma after "however".
Col. 3, line 42, insert --through-- after "vermiculite".
Col. 4, line 41, change "insert" to --inert--.

Signed and sealed this 13th day of June 1972.

(SEAL)
Attest:

EDWARD M. FLETCHER, JR.
Attesting Officer

ROBERT GOTTSCHALK
Commissioner of Patents